US007352732B2

(12) United States Patent
Sata et al.

(10) Patent No.: US 7,352,732 B2
(45) Date of Patent: Apr. 1, 2008

(54) SERVICE PROVIDING APPARATUS, SERVICE PROVIDING PROGRAM AND SERVICE PROVIDING METHOD

(75) Inventors: Yutaka Sata, Tokyo (JP); Akihiko Sugikawa, Kanagawa-Ken (JP); Shingo Tanaka, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 763 days.

(21) Appl. No.: 10/776,275

(22) Filed: Feb. 12, 2004

(65) Prior Publication Data

US 2004/0218574 A1 Nov. 4, 2004

(30) Foreign Application Priority Data

Feb. 17, 2003 (JP) .............................. 2003-038668

(51) Int. Cl.
*H04Q 7/24* (2006.01)
(52) U.S. Cl. .................... 370/338; 455/411; 455/41.2; 455/552.1
(58) Field of Classification Search ............... 370/310, 370/338, 328; 455/410–411, 41.1, 41.2, 455/41.3, 552.1
See application file for complete search history.

(56) References Cited

U.S. PATENT DOCUMENTS

| | | | |
|---|---|---|---|
| 7,158,756 B2* | 1/2007 | Palin et al. ................. | 455/41.2 |
| 2001/0047441 A1 | 11/2001 | Robertson | |
| 2001/0052858 A1 | 12/2001 | Vincent et al. | |
| 2002/0077060 A1 | 6/2002 | Lehikoinen et al. | |
| 2006/0046719 A1* | 3/2006 | Holtschneider ............. | 455/434 |

FOREIGN PATENT DOCUMENTS

| | | |
|---|---|---|
| EP | 1 133 119 A2 | 9/2001 |
| EP | 1 213 882 A2 | 6/2002 |
| JP | 2001-144781 | 5/2001 |
| JP | 2002-9695 | 1/2002 |
| JP | 2002-63652 | 2/2002 |
| JP | 2002-298177 | 10/2002 |
| JP | 2003-32175 | 1/2003 |
| JP | 2003-188805 | 7/2003 |

OTHER PUBLICATIONS

Toru Aihara, "Short-Distance Radio Communication Specification Bluetooth", bit, Kyoritsu Shuppan, Co., Ltd., vol. 32, No. 10, Oct. 1, 2000, pp. 8-16.

* cited by examiner

*Primary Examiner*—Nguyen T. Vo
(74) *Attorney, Agent, or Firm*—Oblon, Spivak, McClelland, Maier & Neustadt, P.C.

(57) ABSTRACT

A service providing apparatus has a first communication unit, a connection information generator, an existence detector, an existence confirmation request receiver, a connection information transmitter, an authentication unit, and a service providing unit. The second communication unit performs wireless communication with the service receiver located in a second wireless area narrower than a first wireless area. The existence confirmation request receiver receives the existence confirmation request signal transmitted by the service receiver through the second communication unit when the service receiver detects to be within a prescribed distance. The service providing unit connects with the service receiver authenticated by the authentication unit, and provides services to the service receiver through the first communication unit.

21 Claims, 11 Drawing Sheets

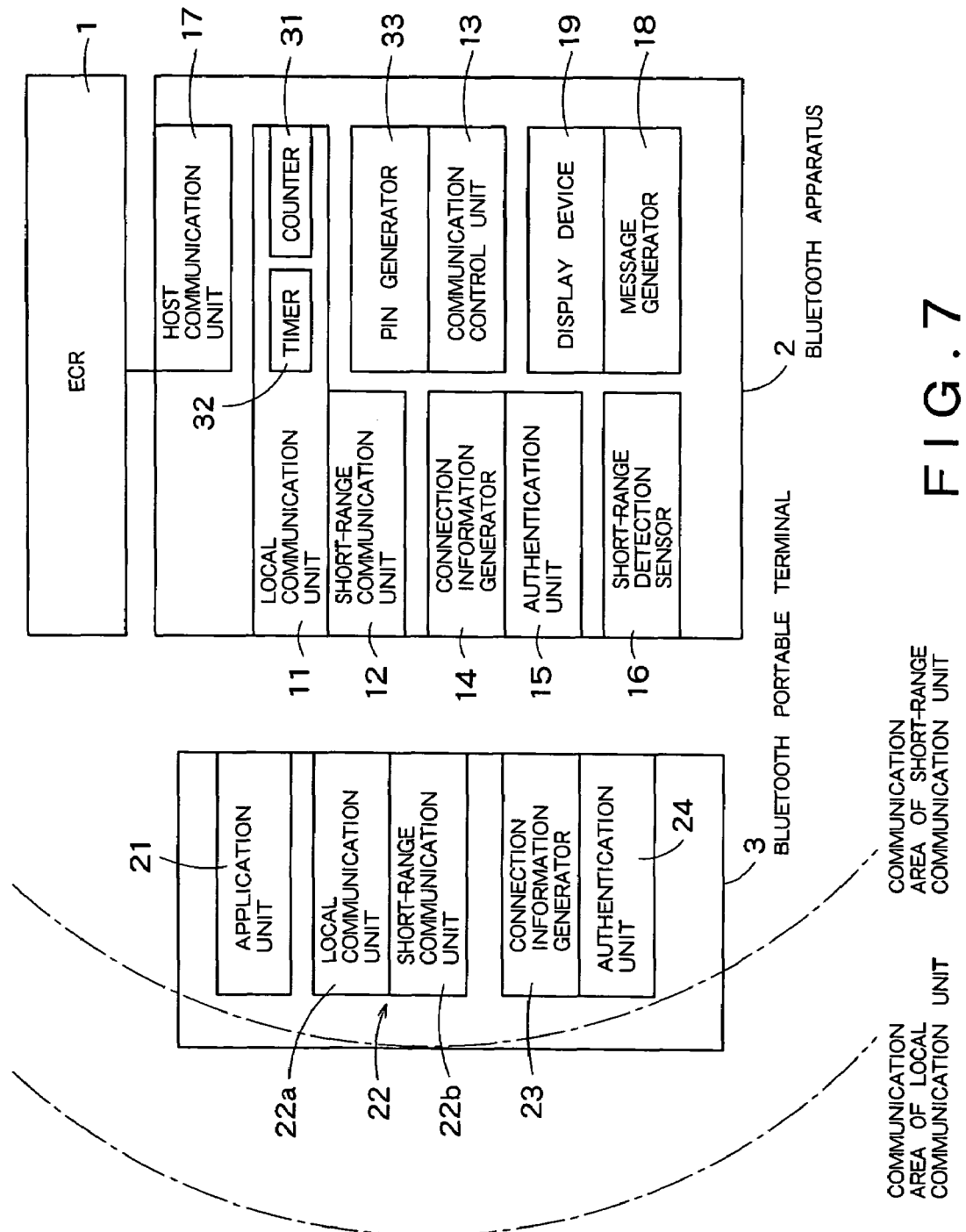
F I G. 7

SERVICE PROVIDING APPARATUS, SERVICE PROVIDING PROGRAM AND SERVICE PROVIDING METHOD

CROSS REFERENCE TO RELATED APPLICATIONS

This application claims benefit of priority under 35 USC §119 to Japanese Patent Application No. 2003-38668, filed on Feb. 17, 2003, the entire contents of which are incorporated by reference herein.

BACKGROUND OF THE INVENTION

1. Field of the Invention

The present invention relates to a service providing apparatus, a service providing program and a service providing method that provide various services for a service receiver by using short-range wireless communication.

2. Related Art

Recently, short-range wireless communication systems having a transmission distance of approximately 10 m are attracting attention. Whereas the effective transmission distance range of the conventional wireless LAN is at least 100 m, the short-range wireless communication system is narrow in transmission range and accordingly less in used power. Therefore, the short-range wireless communication system is suitable for an information processing apparatus having limitations in battery, such as a portable information processing apparatus (hereafter referred to simply as portable terminal) like a portable telephone or a PDA.

Bluetooth (™) is one of such short-range wireless communication systems. In recent years, portable terminals mounting the Bluetooth communication means have spread.

Since the unit price of the device is inexpensive and size reduction of the apparatus is possible in Bluetooth, apparatuses having the Bluetooth communication function are expected to be spread everywhere hereafter. If Bluetooth is spread, provision of service and information according to the place can be obtained in an arbitrary place.

For example, in convenience stores, supermarkets, retail stores or the like, provision of service for purchasers, such as electronic coupon service, electronic point service, electronic settlement, and receipt and voucher issuance, becomes possible. Furthermore, applications of the Bluetooth using electronic tickets to gate opening/closing control, settlement and discount service in automatic vending machines, and charge paying in parking lots, gas stations and drive-throughs are also anticipated. Besides, access to the Internet, information delivery depending upon specific places, provision of user's position information, and route guide or the like also become possible.

Hereafter, a conventional technique will be described by taking as an example the case where connection using the Bluetooth is established between a portable terminal having a Bluetooth communication function (hereafter referred to simply as Bluetooth portable terminal) and an information processing apparatus having a Bluetooth communication function and providing various services (hereafter referred to simply as Bluetooth apparatus), and the Bluetooth apparatus provides service for a user having the Bluetooth portable terminal.

First, a procedure for the Bluetooth portable terminal to get service from an arbitrary opposite party in an arbitrary place will now be described. First, a client application program to get service is started. Subsequently, the client application in the Bluetooth portable terminal orders a Bluetooth module to execute an inquiry command for a specified time, typically for 10 seconds in order to find an apparatus with which communication can be conducted. The Bluetooth module is a functional block incorporated in each of the Bluetooth portable terminal and the Bluetooth apparatus to conduct communication processing according to Bluetooth specifications. The Bluetooth module is typically formed of an IC chip.

If the inquiry is completed after a specified time has elapsed, the client application sends to the Bluetooth module a command for acquiring remote names, which are identification names respectively of Bluetooth apparatuses found during that time, or identification names of services provided by the Bluetooth apparatuses.

The client application acquires remote names of all found Bluetooth apparatuses, then shows a list of the acquired remote names to the user, and urges the user to select a Bluetooth apparatus to be connected. Subsequently, the client application orders the Bluetooth module to transmit an ACL connection request command selected by the user to the Bluetooth apparatus.

According to setting, a terminal authentication procedure is conducted during the ACL connection operation in some cases. Alternatively, both apparatuses maybe authenticated by inputting the same link key or the same PIN code in order to generate a link key in both apparatuses. For using encryption communication, authentication processing is executed, and then a temporary encryption key for encryption communication is created on the basis of the link key.

After completion of the ACL connection, the client application orders a module called Bluetooth stack to transmit a service information acquisition command. Subsequently, the client application acquires service information from the Bluetooth apparatus, and thereby acquires information concerning a protocol to be used by the application.

Subsequently, the client application orders the module called Bluetooth stack to execute connection of a protocol to be used by the client application, by using information corresponding to the protocol. For example, if the client application uses OBEXFTP to get service, the client application calls a connection request function of OBEX. In this case, the stack executes connections of RFCOMM and L2CAP in order, and after the completion of connection of low order layers, a connection of an OBEX protocol is realized.

After the completion of the connection of the protocol, the client application conducts server authentication by conducting challenge response or the like at an application level. In the case of OBEX, the OBEX protocol itself has an authentication function. Even if the authentication function in the OBEX protocol is used, authentication of the service providing apparatus is possible.

Owing to the procedure heretofore described, it becomes possible for the user to get desired service by using the Bluetooth portable terminal.

If the above-described procedure is executed, however, processing time required until the user gets service is typically as long as 10 and several seconds, because inquiry processing is conducted for a fixed time even in the case where there is only one apparatus with which communication can be conducted. If there are a large number of apparatuses with which communication can be conducted, the processing time increases in proportion to the number of apparatuses with which communication can be conducted. Supposing that an average of approximately 1 second is required to acquire a remote name and N apparatuses have been found, processing time of N seconds is required to acquire remote names of all apparatuses.

For example, in the case where a large number of registers are arranged at intervals of 1 m in a supermarket or the like and a shopper searches for a register in order to make payment, approximately 20 registers are found, because the distance over which the Bluetooth communication can be executed is approximately 10 m. Therefore, it takes approximately 20 seconds to acquire remote names of all registers.

As a measure to eliminate such an inconvenience, there is a technique of using a COD (Class of Device) having information concerning the kinds of the Bluetooth apparatus. The information is included in information that can be acquired by the inquiry. Thereby, only apparatuses that can provide desired service can be selected.

However, the COD identifies the kinds of the apparatus, and it does not identify the service itself. For example, even if a category of settlement service exists in the COD, all registers belong to that category in the above-described example, and the COD is not useful to sorting.

In general, wireless communication has an advantage that there are no effects of the positional relationship between two apparatuses and an interception substance as compared with communication using infrared light. On the other hand, wireless communication has a property that it is difficult to set connection with only a terminal that exists in a specific position.

In the case where there are one customer (one Bluetooth portable terminal) and one register (one Bluetooth apparatus), the relationship between the Bluetooth portable terminal carried by a customer who makes payment and the cash register apparatus is determined uniquely, and consequently a problem concerning the connection is not posed. In other words, if a person who operates the Bluetooth portable terminal has found a Bluetooth apparatus by using the above-described Bluetooth apparatus search function, the found apparatus can be regarded as a cash register apparatus.

However, in the above-described example of the supermarket, a plurality of cash register apparatuses exist in the communication possible range and a cash register apparatus on an adjacent line is also found. The user having the Bluetooth portable terminal needs to check names or the like of cash register apparatuses and select a cash register apparatus to determine in which of the found cash register apparatuses payment should be made.

If extra time is needed to select the opposite party of communication, it takes time until the user gets service and the convenience for the user is worsened. In the case of payment at a register in a supermarket, register operations are hindered at the time of congestion when a large number of customers form lines.

In addition, if a person who operates the Bluetooth portable terminal specifies a wrong cash register apparatus, a discount from the amount payable might not be conducted even when a coupon is used, or points of another person might be added to those of the person. Cancellation works need to be conducted in both the Bluetooth portable terminal and the cash register apparatus, accordingly a great deal of labor is needed.

Therefore, an operator of a cash register needs to ascertain from the customer whether or not the connected Bluetooth portable terminal is right, by using some information accompanying the Bluetooth portable terminal. Such selection or ascertainment work is not an agreeable interface for a customer who makes payment, and hinders the register operations of the operator.

SUMMARY OF THE INVENTION

The present invention has been made in view of the above-described points. An object of the present invention is to provide a service providing apparatus, a service providing program and a service providing method capable of providing only a desired service receiver with service desired by the service receiver.

In order to achieve the foregoing object, a service providing apparatus according to an embodiment of the present invention, comprising:

a first communication unit configured to perform wireless communication with a service receiver located within a first wireless area;

a second communication unit configured to perform wireless communication with said service receiver located within a second wireless area narrower than said first wireless area;

a connection information generator which generates connection information necessary to the communication with said service receiver when the communication is performed through said first communication unit;

an existence detector which detects whether or not said service receiver locates within a prescribed distance;

an existence confirmation request receiver which receives an existence confirmation request signal transmitted by said service receiver, through said second communication unit when detected that said service receiver is located within the prescribed distance;

a connection information transmitter which transmits the connection information generated by said connection information generator to said service receiver through said second communication unit as a reply of said existence confirmation request signal;

an authentication unit configured to authenticate said service receiver which requested connection based on the transmitted connection information, through said first communication unit; and a service providing unit configured to connect with said service receiver authenticated by said authentication unit and provide the services to said service receiver through said first communication unit.

Furthermore, a service providing program according to an embodiment of the present invention which makes a computer operate the steps of comprising:

performing a first wireless communication with a service receiver located within a first wireless area;

performing a second wireless communication with said service receiver located within a second wireless area narrower than said first wireless area;

generating connection information necessary to communication with said service receiver when performing said first wireless communication;

detecting whether or not said service receiver locates within a prescribed distance;

receiving an existence confirmation request signal transmitted from said service receiver through said second wireless communication when it is detected that said service receiver locates within the prescribed distance;

transmitting the connection information to said service receiver through said second wireless communication as a reply of said existence confirmation request signal;

authenticating said service receiver which has requested connection based on the transmitted connection information, through said first wireless communication; and providing services to the authenticated service receiver through said first wireless communication.

Furthermore, a service providing method according to an embodiment of the present invention, comprising:

performing a first wireless communication with a service receiver located within a first wireless area;

performing a second wireless communication with said service receiver located within a second wireless area narrower than said first wireless area;

generating connection information necessary to communication with said service receiver when performing said first wireless communication;

detecting whether or not said service receiver locates within a prescribed distance;

receiving an existence confirmation request signal transmitted from said service receiver through said second wireless communication when it is detected that said service receiver locates within the prescribed distance;

transmitting the connection information to said service receiver through said second wireless communication as a reply of said existence confirmation request signal;

authenticating said service receiver which has requested connection based on the transmitted connection information, through said first wireless communication; and providing services to the authenticated service receiver through said first wireless communication.

BRIEF DESCRIPTION OF THE DRAWINGS

FIG. 7 is a block diagram showing an overall configuration of a short-range communication system having a service providing apparatus according to the fourth embodiment of the present invention.

DESCRIPTION OF THE PREFERRED EMBODIMENTS

Hereafter, a service providing apparatus, a service providing program and a service providing method according to the present invention will be described concretely with reference to the drawings.

First Embodiment

Figure 1:
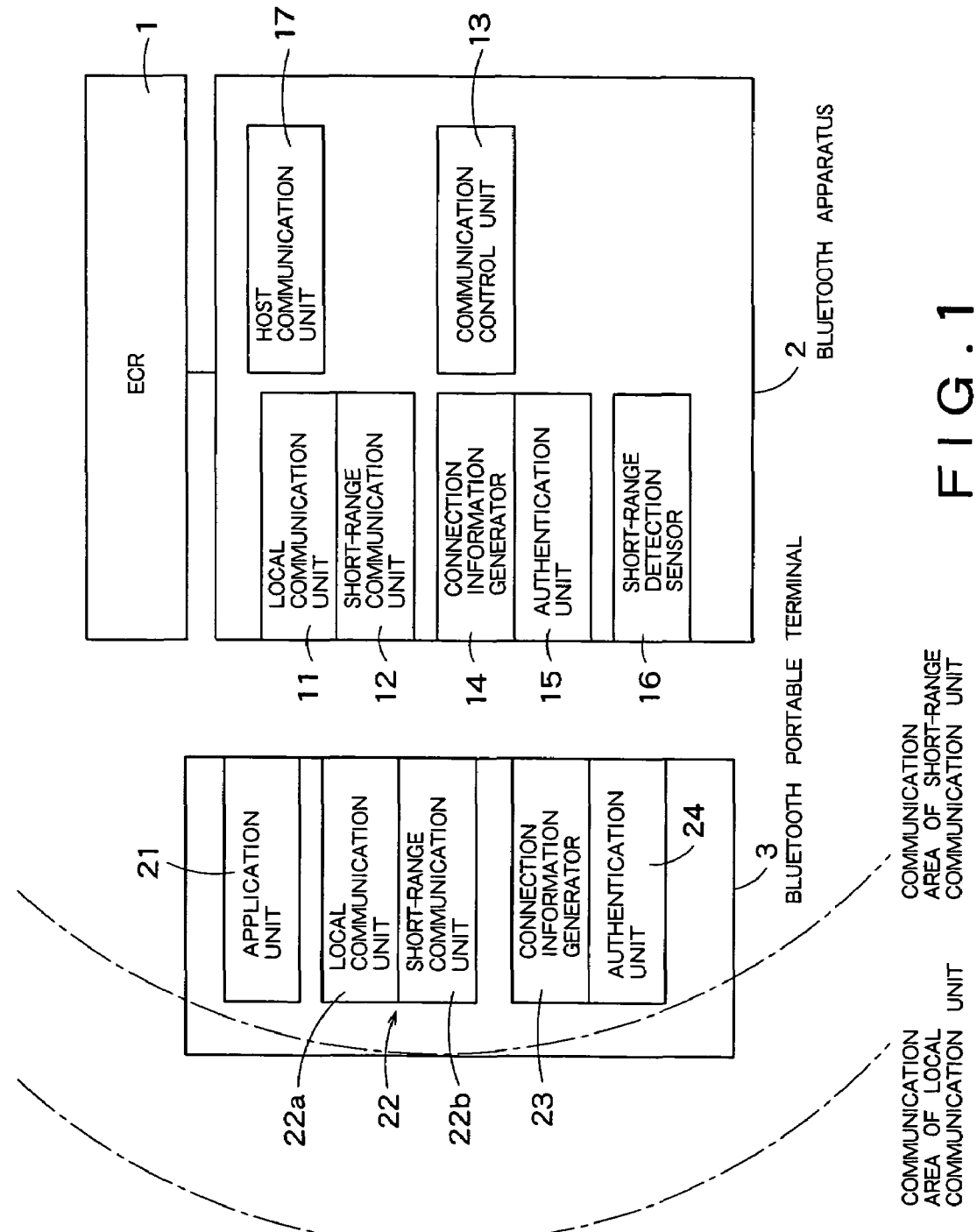
FIG. 1 is a block diagram showing an overall configuration of a first embodiment of a short-range communication system.

FIG. 1 is a block diagram showing an overall configuration of a first embodiment of a short-range communication system including a service providing apparatus according to the present invention and a service receiver, which get service provision from the service providing apparatus. The short-range communication system shown in FIG. 1 includes a service providing apparatus (hereafter referred to as Bluetooth apparatus) 2 connected to an electronic cash register (hereafter referred to as ECR) 1, and a service receiver (hereafter referred to as Bluetooth portable terminal) 3 to conduct wireless communication with the Bluetooth apparatus 2 according to Bluetooth specifications.

The Bluetooth apparatus 2 includes a local communication unit 11 to conduct ordinary wireless communication according to the Bluetooth specifications, a short-range communication unit 12 to conduct wireless communication in a range narrower than a communication area of the local communication unit 11, a communication controller 13 to control the local communication unit 11 and the short-range communication unit 12, a connection information generator 14 to generate connection information required for communication with the Bluetooth portable terminal 3, an authentication unit 15 to conduct authentication with the Bluetooth portable terminal 3, a short-range detection sensor 16 to determine whether or not the Bluetooth portable terminal 3 is in a proximity range, and a host communication unit 17 to conduct communication with the ECR 1 serving as a host.

The local communication unit 11 includes a Bluetooth device and an antenna, which are not illustrated. The short-range communication unit 12 includes a Bluetooth device, an output attenuator, which is not illustrated, and a directional antenna. By the attenuator, the communication area of the short-range communication unit 12 is adjusted so as to become narrower than that of the local communication unit 11.

Incidentally, it is not always necessary for each of the local communication unit 11 and the short-range communication unit 12 to separately have a Bluetooth device, but the local communication unit 11 and the short-range communication unit 12 may share one Bluetooth device. In this case, an output of the Bluetooth device is switched to the antenna of the local communication unit 11 or the antenna of the short-range communication unit 12 by a high frequency switch, which is not illustrated.

The Bluetooth portable terminal 3 includes an application unit 21, which stores a program to control operation of the Bluetooth portable terminal 3, a wireless communication unit 22 to conduct wireless communication with the Bluetooth apparatus 2 according to the Bluetooth specifications, a connection information generator 23 to generate connection information required for communication with the Bluetooth apparatus 2, and an authentication unit 24 to conduct authentication with the Bluetooth apparatus 2. The wireless communication unit 22 includes a local communication unit 22a to conduct communication with the local communication unit 11 in the Bluetooth apparatus 2, and a short-range communication unit 22b to conduct communication with the short-range communication unit 12 in the Bluetooth apparatus 2.

The short-range detection sensor 16 is formed of, for example, an infrared light sensor. Its subject detectable area nearly coincides with the communication area of the short-range communication unit 12. On the basis of a result of detection conducted by the short-range detection sensor 16, therefore, it can be determined whether or not the Bluetooth portable terminal 3 is located in the communication area of the short-range communication unit 12.

Figure 2:
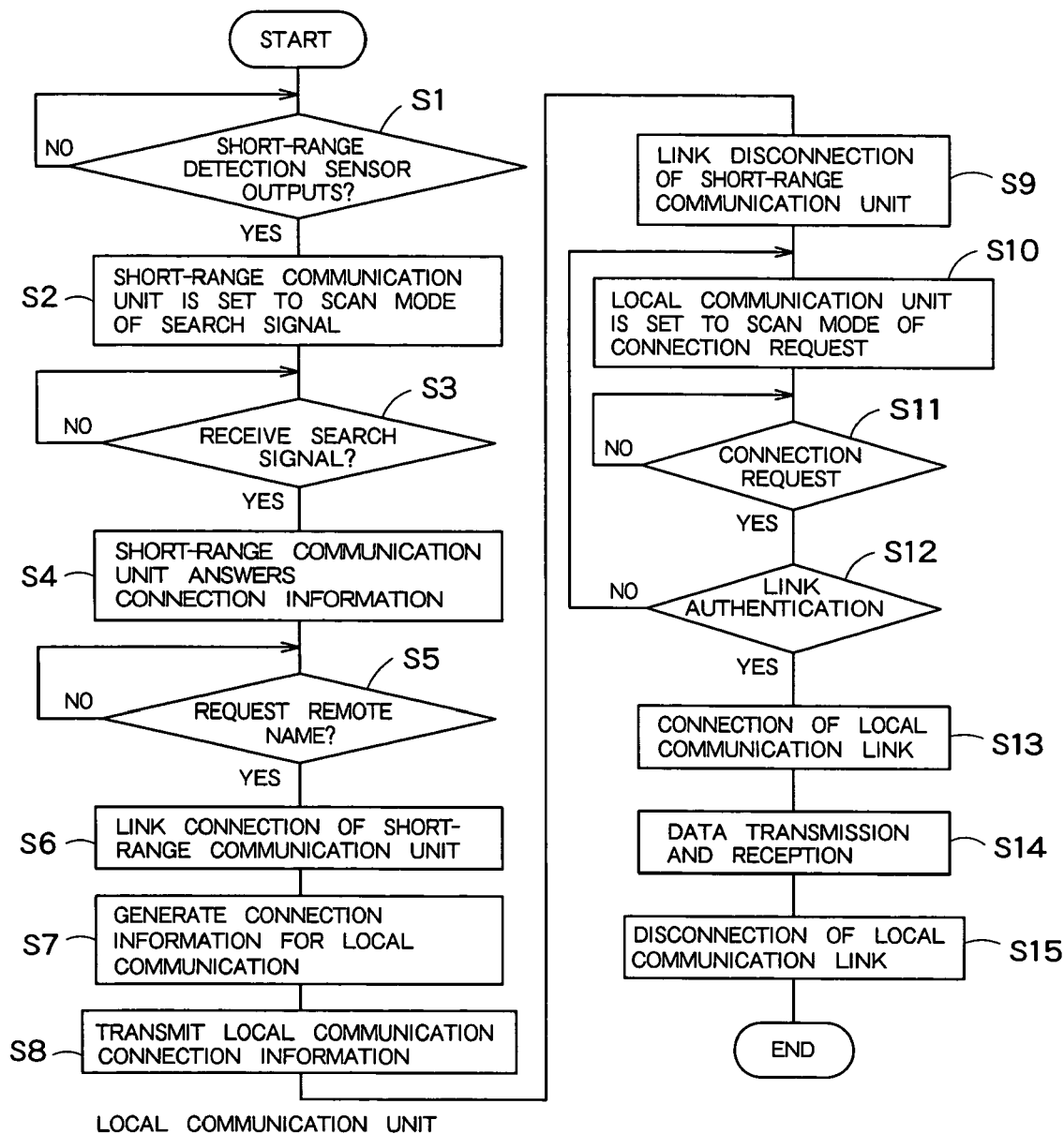
FIG. 2 is a flow chart showing an example of a processing procedure of the short-range communication system.

FIG. 2 is a flow chart showing an example of a processing procedure of the short-range communication system. If the short-range detection sensor 16 in the Bluetooth apparatus 2 detects existence of a subject (step S1), the short-range communication unit 12 comes in a reception (scan) mode of a search signal from the Bluetooth portable terminal 3 (step S2). Subsequently, it is determined whether or not the short-range communication unit 12 has received the search signal (Inquiry) (step S3). After the search signal has been received, connection information of the short-range communication unit 12 is replied (Inquiry Response) (step S4).

Subsequently, it is determined whether or not there has been a remote name acquisition request from the Bluetooth portable terminal 3 (step S5). If there has been an acquisition request, a link for the short-range communication unit 12 is established (step S6). Thereafter, connection information of the local communication unit 11 is generated (step S7). And the generated connection information is transmitted to the Bluetooth portable terminal 3 via the short-range communication unit 12 as a remote name (step S8), and the link is disconnected (step S9). As this connection information, for example, address information and authentication information of the Bluetooth device in the local communication unit 11 are given.

Subsequently, the local communication unit 11 is brought into the connection request reception (scan) mode (step S10). If a connection request from the Bluetooth portable terminal 3 is received (step S11), bidirectional entity authentication is executed (step S12). If the authentication has failed, the processing returns to the step S10. If the authentication has succeeded, then a link for the local communication unit 11 is connected (step S13), data required for application is transmitted and received (step S14), and finally the link for the local communication unit is disconnected and the processing is finished (step S15).

Thus, in the first embodiment, only in the case where the user holding the Bluetooth portable terminal 3 brings the own terminal close to the Bluetooth apparatus 2 and requests connection, the short-range communication unit 12 in the Bluetooth apparatus 2 is set to the search signal reception mode. Therefore, a fear of making an answer to a search signal sent from a Bluetooth portable terminal 3 located outside the proximity area is eliminated. Furthermore, after the short-range communication unit 12 has transmitted connection information of the local communication unit 11, the local communication unit 11 is set to the connection request reception mode. Therefore, a connection request from a Bluetooth portable terminal that has not acquired regular connection information transmitted from the short-range communication unit 12 is not accepted, resulting in high degree of security.

Second Embodiment

In a second embodiment, the fact that the operation mode of the Bluetooth apparatus 2 has changed is notified by a message.

Figure 3:
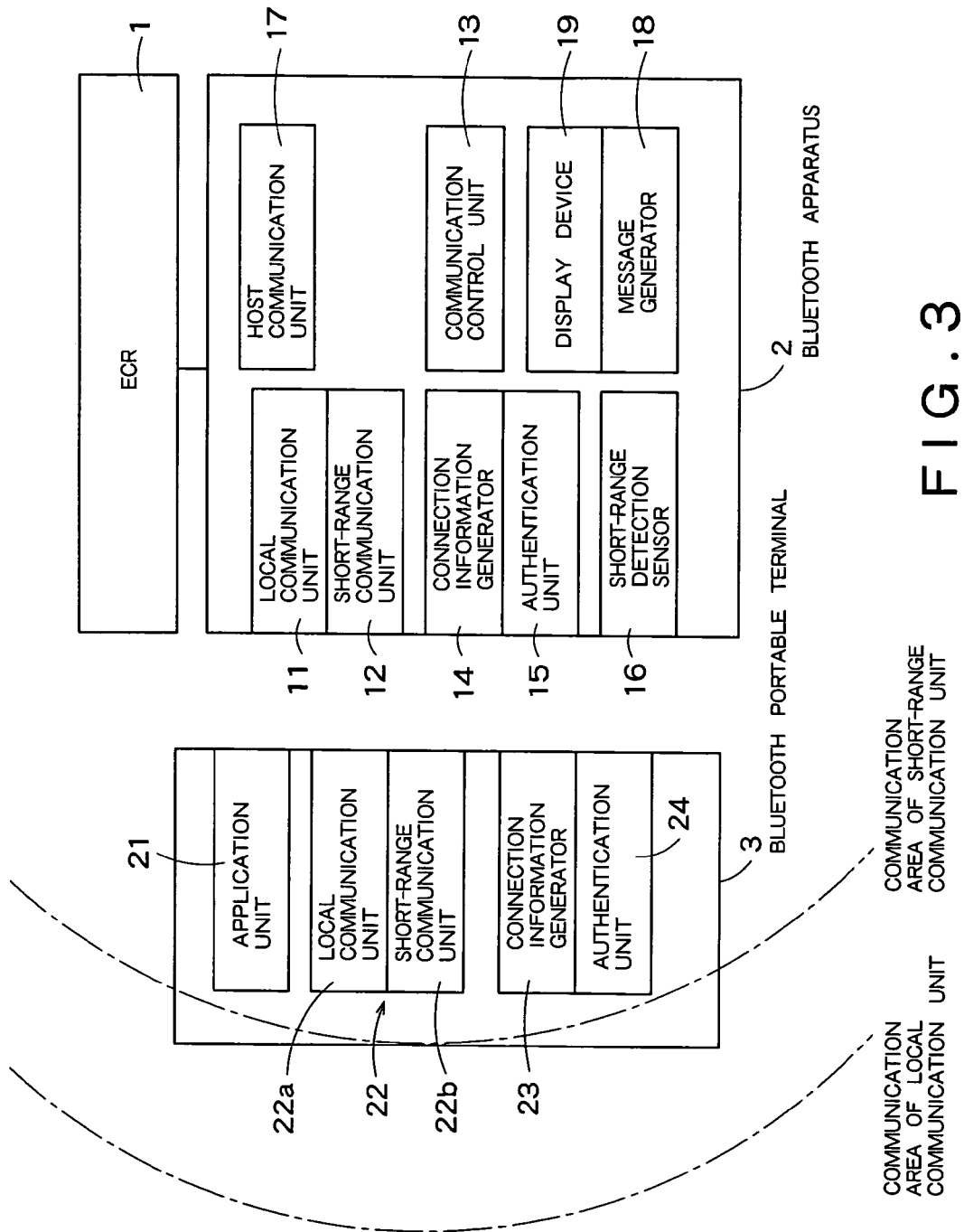
FIG. 3 is a block diagram showing an overall configuration of a short-range communication system including a service providing apparatus according to a second embodiment of the present invention.

FIG. 3 is a block diagram showing an overall configuration of a short-range communication system including a service providing apparatus (Bluetooth apparatus 2) according to a second embodiment of the present invention. The Bluetooth apparatus 2 shown in FIG. 3 includes, besides the configuration shown in FIG. 1, a message generator 18 to generate a message to the effect that the Bluetooth portable terminal 3 has approached, and a display device 19 to display the message. The display device 19 may be a character display device such as a LCD, or maybe a light emitting device (diode or the like) that switches the display form according to the operation mode of the Bluetooth apparatus 2.

Figure 4:
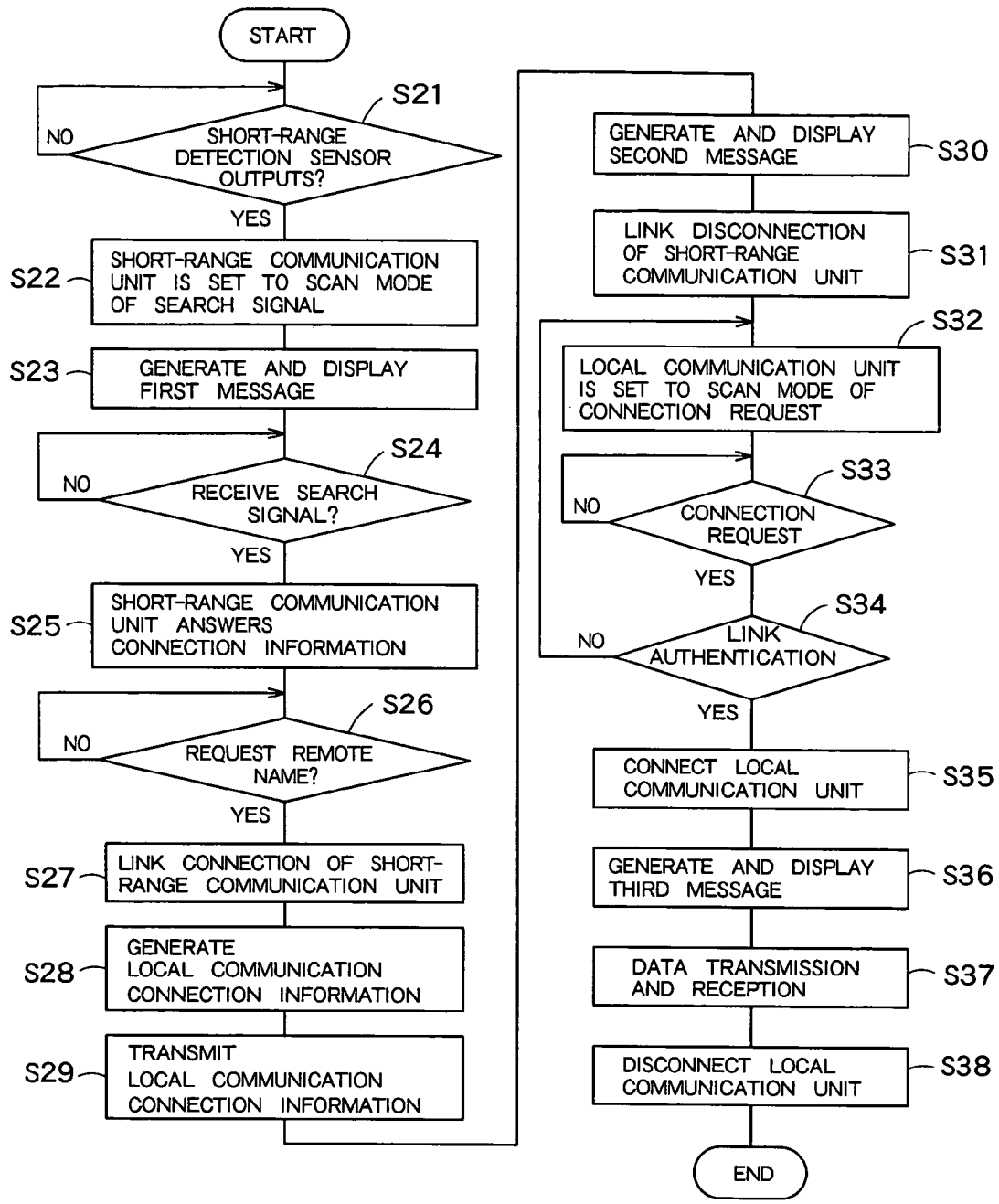
FIG. 4 is a flow chart showing an example of a processing procedure of the short-range communication system shown in FIG. 3.

FIG. 4 is a flow chart showing an example of a processing procedure of the short-range communication system shown in FIG. 3. Hereafter, processing operation of the short-range communication system shown in FIG. 3 will be described featuring the processing differing from that shown in FIG. 2. The short-range detection sensor 16 in the Bluetooth apparatus 2 detects proximity of a subject (step S21). The short-range communication unit 12 makes a transition to the search signal (Inquiry) reception mode state (step S22). Then, a first message corresponding to that state transition is generated by the message generator 18, and displayed on the display device 19 (step S23).

Thereafter, the short-range communication unit 12 transmits the connection information of the local communication unit 11 (step S29), and the local communication unit 11 makes a transition to the connection request reception mode. Then, a second message corresponding to that state of the Bluetooth apparatus 2 is generated, and displayed on the display device 19 (step S30).

Thereafter, after authentication has succeeded in the local communication unit 11 (step S34) and connection for the local communication unit 11 is completed (step S35), a third message to give notice of connection completion is generated and displayed on the display device 19 (step S36).

Thus, in the second embodiment, notice that the operation mode of the Bluetooth apparatus 2 has been switched is given by using the first to third messages. Therefore, it becomes easy for the user to grasp the operation state of the Bluetooth apparatus 2 and the connection state of the Bluetooth portable terminal 3.

By the way, at least one of the generation and display of the first to third messages may be conducted.

Third Embodiment

In a third embodiment, the number of Bluetooth portable terminals 3 each of which has sent a connection request to the Bluetooth apparatus 2 is measured.

Originally, the Bluetooth apparatus 2 should be designed so as to establish a one-to-one connection with a Bluetooth portable terminal 3 carried by a nearby customer who is conducting settlement for purchased commodities at the ECR 1 and execute application. If in such application connection requests are issued to the local communication unit 11 simultaneously by two or more Bluetooth devices, (1) there is a fear that a connection request from another customer being around or from another Bluetooth portable terminal 3 of the same customer might be received, or (2) there is also a fear of being attacked by an illegal connection request.

In the third embodiment, therefore, the number of the Bluetooth portable terminals 3 each issuing a connection request is checked, and wireless communication is conducted with only a desired Bluetooth portable terminal 3.

Figure 5:
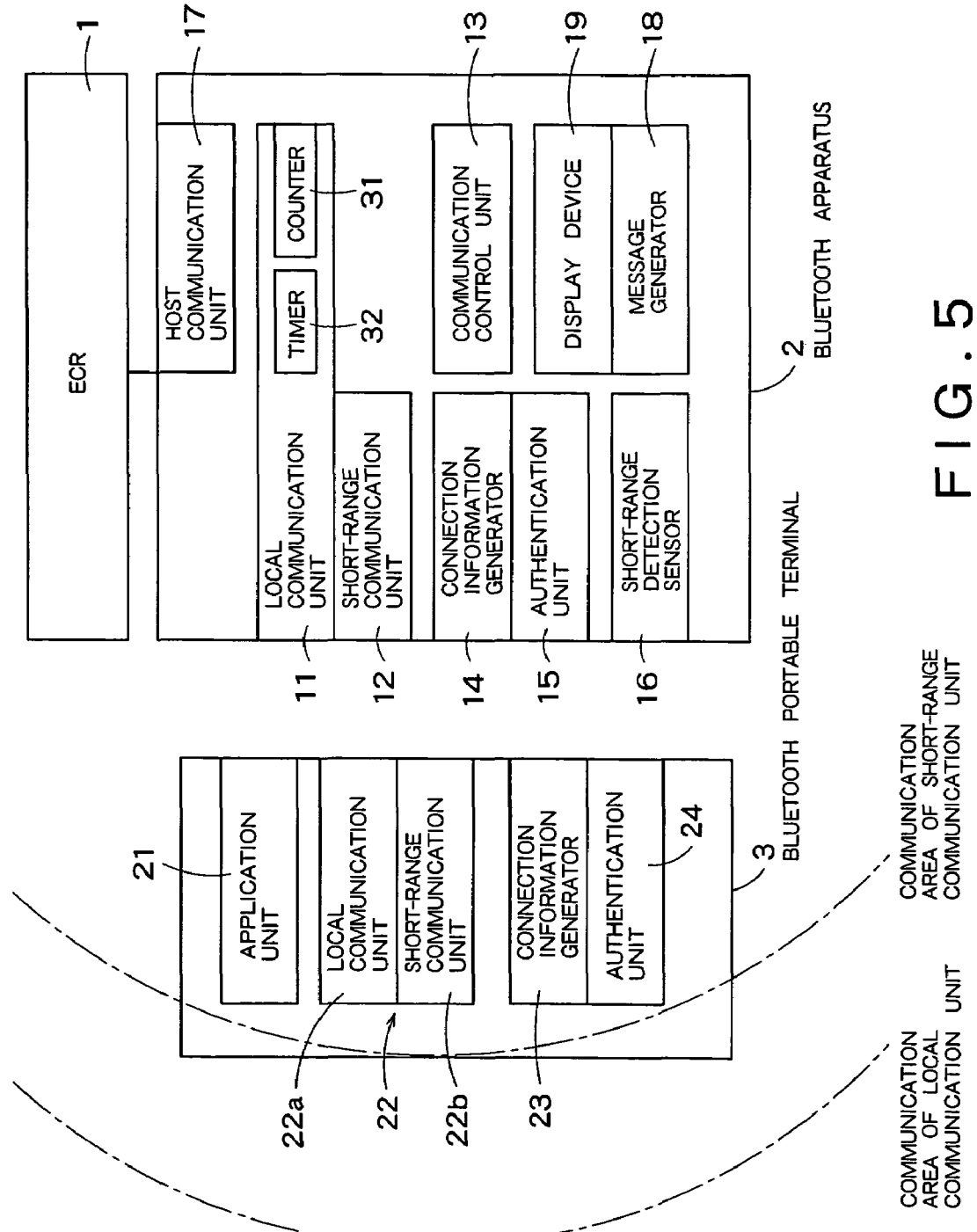
FIG. 5 is a block diagram showing an overall configuration of a short-range communication system having a service providing apparatus according to the third embodiment of the present invention.

FIG. 5 is a block diagram showing an overall configuration of a short-range communication system having a service providing apparatus (Bluetooth apparatus 2) according to the third embodiment of the present invention. The Bluetooth apparatus 2 shown in FIG. 5 includes, besides the configuration shown in FIG. 3, a counter 31 to measure the number of Bluetooth portable terminals 3 each of which has issued a connection request, and a timer 32 to measure the time.

Figure 6:
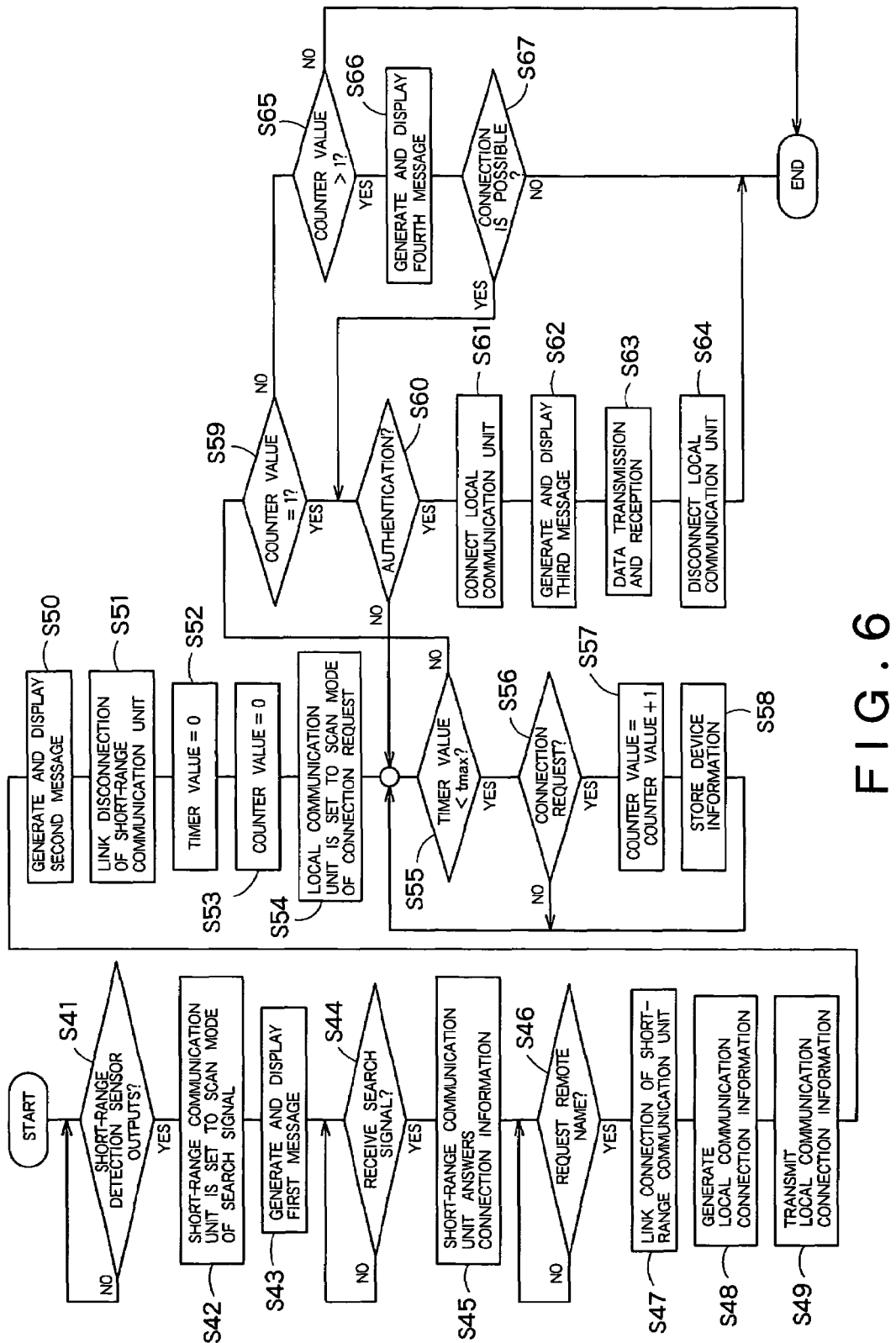
FIG. 6 is a flow chart showing an example of a processing procedure of the short-range communication system shown in FIG. 5.

FIG. 6 is a flow chart showing an example of a processing procedure of the short-range communication system shown in FIG. 5. Hereafter, processing operation of the short-range communication system shown in FIG. 5 will be described featuring the processing differing from that shown in FIG. 4. The link for the short-range communication unit 12 is disconnected (step S51), and thereafter values of both the timer 32 and the counter 31 are reset to zero, and timer measurement is started (steps S52 and S53).

Subsequently, the local communication unit 11 is set to the connection request reception mode (step S54), and it is determined whether or not the timer value is less than a predetermined value tmax (step S55). If the timer value is less than the predetermined value, it is determined whether or not there has been a connection request from a Bluetooth portable terminal 3. If there is no connection request, the processing returns to step S55. If there is a connection request, the counter value is incremented by "1" (step S57). Subsequently, device information of a Bluetooth portable terminal 3 that has issued a connection request is stored (step S58), and then the processing is returned to the step S55. Processing of the steps S55 to S58 is repeated until the measurement time in the timer 32 reaches a predetermined time (step S57).

If the measurement time in the timer 32 has reached the predetermined time, it is determined whether or not the counter value is "1" (step S59). If the counter value is "1," the authentication procedure with the Bluetooth portable terminal 3 that has issued the connection request is carried out (step S60). If the authentication has failed, the processing returns to the step S55. If the authentication has succeeded, the local communication unit conducts connection processing (step S61). At this time, a fourth message is generated to indicate that connection for the Bluetooth portable terminal 3 that has issued the connection request is permitted, and the fourth message is displayed on the display device 19 (step S62). Subsequently, data is transmitted and received with the Bluetooth portable terminal 3 via the local communication unit 11 (step S63). If data transmission and reception are completed, the local communication unit 11 is disconnected (step S64).

On the other hand, if the counter value is judged not to be "1" at the step S59, a decision is made whether or not the counter value is greater than "1" (step S65). If the decision is negative, i.e., the counter value is zero, the processing is finished. On the other hand, if the decision is affirmative, i.e., the counter value is at least "2," a fourth message is generated to indicate that there are a plurality of Bluetooth portable terminals 3 each of which has issued a connection request, and the fourth message is displayed on the display device 19 (step S66).

Subsequently, PIN authentication described later is conducted and it is determined whether or not a Bluetooth portable terminal 3 that can be connected exists (step S67). If a Bluetooth portable terminal 3 that can be connected does not exist, the processing is finished. If a Bluetooth portable terminal 3 that can be connected exists, the processing of the step 60 is conducted.

Thus, in the third embodiment, the number of Bluetooth portable terminals 3 each of which has issued a connection request in a predetermined time is measured, and a Bluetooth portable terminals 3 to be connected is determined according to the number. Even in the case where each of a plurality of Bluetooth portable terminals 3 has issued a connection request, therefore, wireless communication can be conducted with an optimum Bluetooth portable terminal 3 among them.

Fourth Embodiment

In a fourth embodiment, authentication is conducted by using a PIN code and thereby the opposite party of communication is restricted more certainly.

FIG. 7 is a block diagram showing an overall configuration of a short-range communication system having a service providing apparatus (Bluetooth apparatus 2) according to the fourth embodiment of the present invention. The Bluetooth apparatus 2 shown in FIG. 7 includes, besides the configuration shown in FIG. 5, a PIN generator 33 to generate a PIN code.

Figure 8:
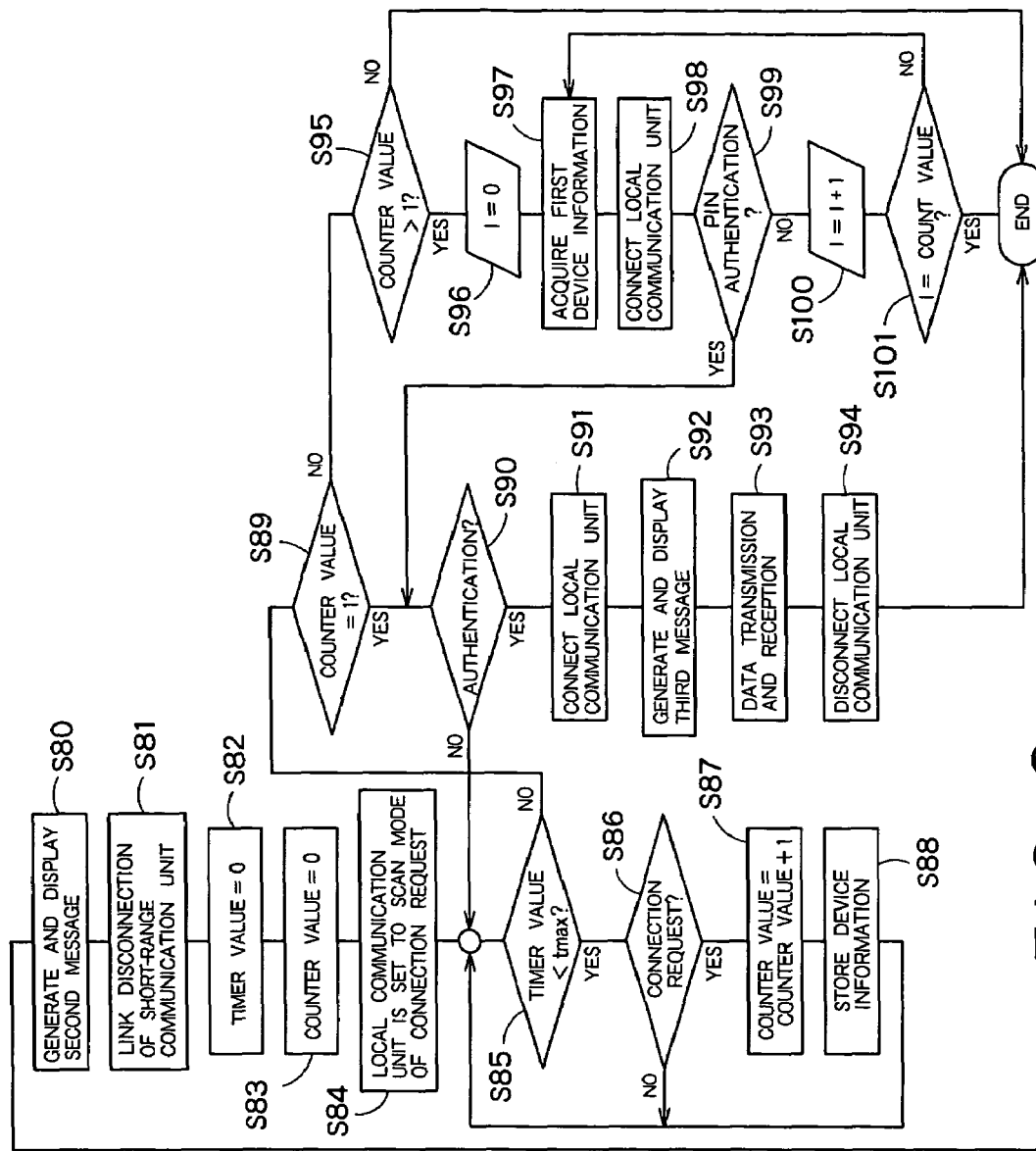
FIG. 8 is a flow chart showing an example of a processing procedure of the short-range communication system shown in FIG. 7.

FIG. 8 is a flow chart showing an example of a processing procedure of the short-range communication system shown in FIG. 7. Hereafter, processing operation of the short-range communication system shown in FIG. 7 will be described featuring the processing differing from that shown in FIG. 6.

If the counter value is not "1" at step S89 in FIG. 8, it is determined whether or not the counter value is greater than "1" (step S95). If the counter value is greater than "1," a variable I is initialized to "1" (step S96). Subsequently, a PIN code is generated by the PIN generator 33 (step S97). The generated PIN code is shown to a user of an Ith Bluetooth portable terminal 3 by the display device 19. The user is urged to input a PIN code. Communication is conducted between the Ith Bluetooth portable terminal 3 and the local communication unit 11 (step S98), and PIN authentication is conducted (step S99). If PIN authentication has succeeded, the authentication procedure at the step S90 is conducted.

If PIN authentication has failed, the variable I is incremented (step S100). Until I reaches the counter value (step S101), the processing of the steps S95 to S100 is repeated.

In the case where there are a plurality of Bluetooth portable terminals 3 each of which has issued a connection request, PIN authentication is conducted with each of the Bluetooth portable terminals 3 and connection with only a Bluetooth portable terminals 3 which has succeeded in PIN authentication is permitted. Thus, in the fourth embodiment, therefore, the degree of security can be further improved.

Fifth Embodiment

In a fifth embodiment, the distance from a Bluetooth portable terminal 3 is measured. Only in the case where the measured distance is less than a predetermined length, connection information of the local communication unit 11 is transmitted to the Bluetooth portable terminal 3.

Figure 9:
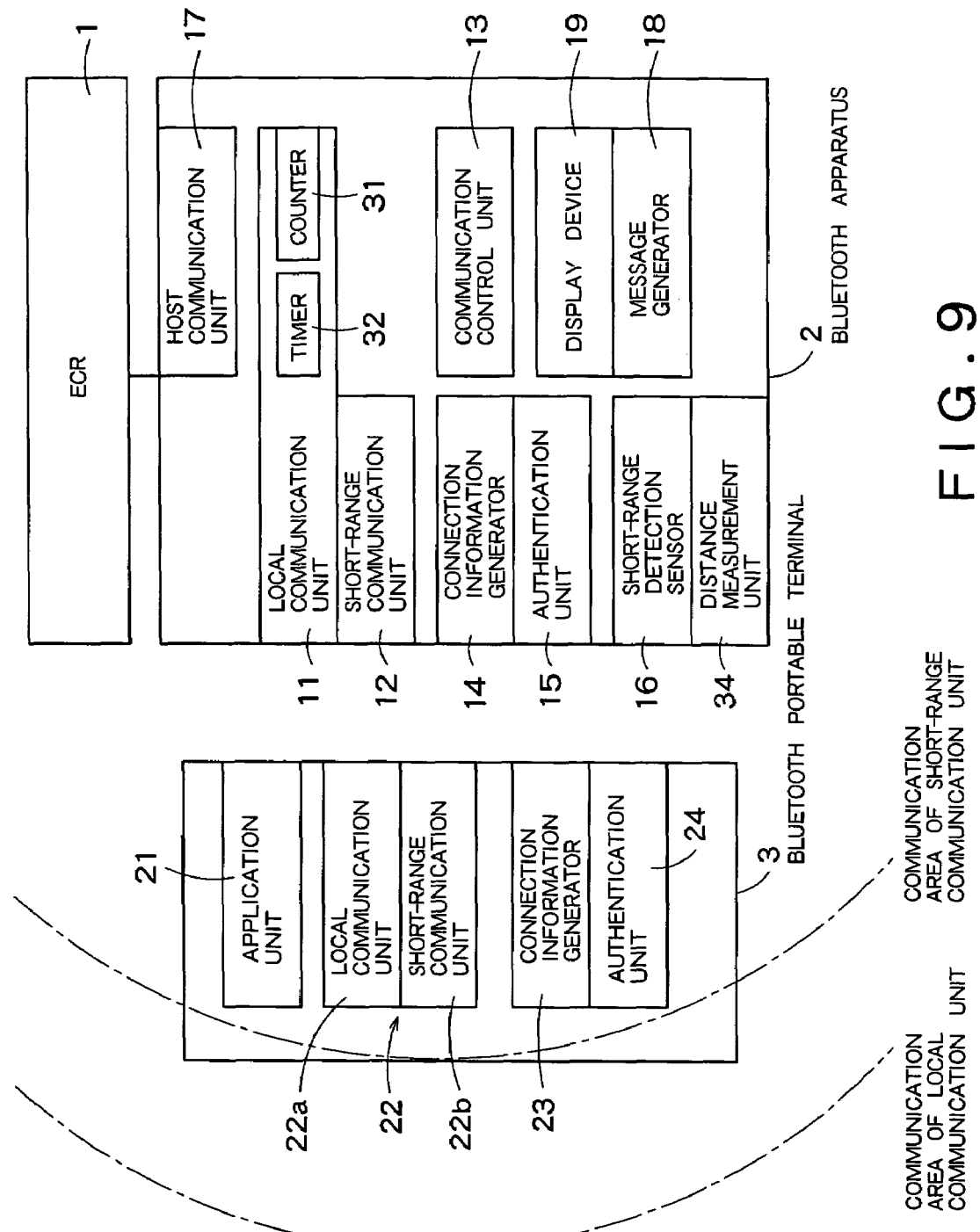
FIG. 9 is a block diagram showing an overall configuration of a short-range communication system having a service providing apparatus according to the fifth embodiment of the present invention.

FIG. 9 is a block diagram showing an overall configuration of a short-range communication system having a service providing apparatus (Bluetooth apparatus 2) according to the fifth embodiment of the present invention. The Bluetooth apparatus 2 shown in FIG. 9 includes, besides the configuration shown in FIG. 7, a distance measurement unit 34 to measure the distance from a Bluetooth portable terminal 3.

More specifically, the distance measurement unit 34 may be a radio wave intensity measurement unit to measure a radio wave intensity and thereby measure a distance, may be a unit to measure a distance by using infrared light or the GPS or the like, or may be a unit to measure a distance on the basis of a phase shift. In other words, there are no specific restrictions in a concrete distance measurement technique in the distance measurement unit 34.

Figure 10:
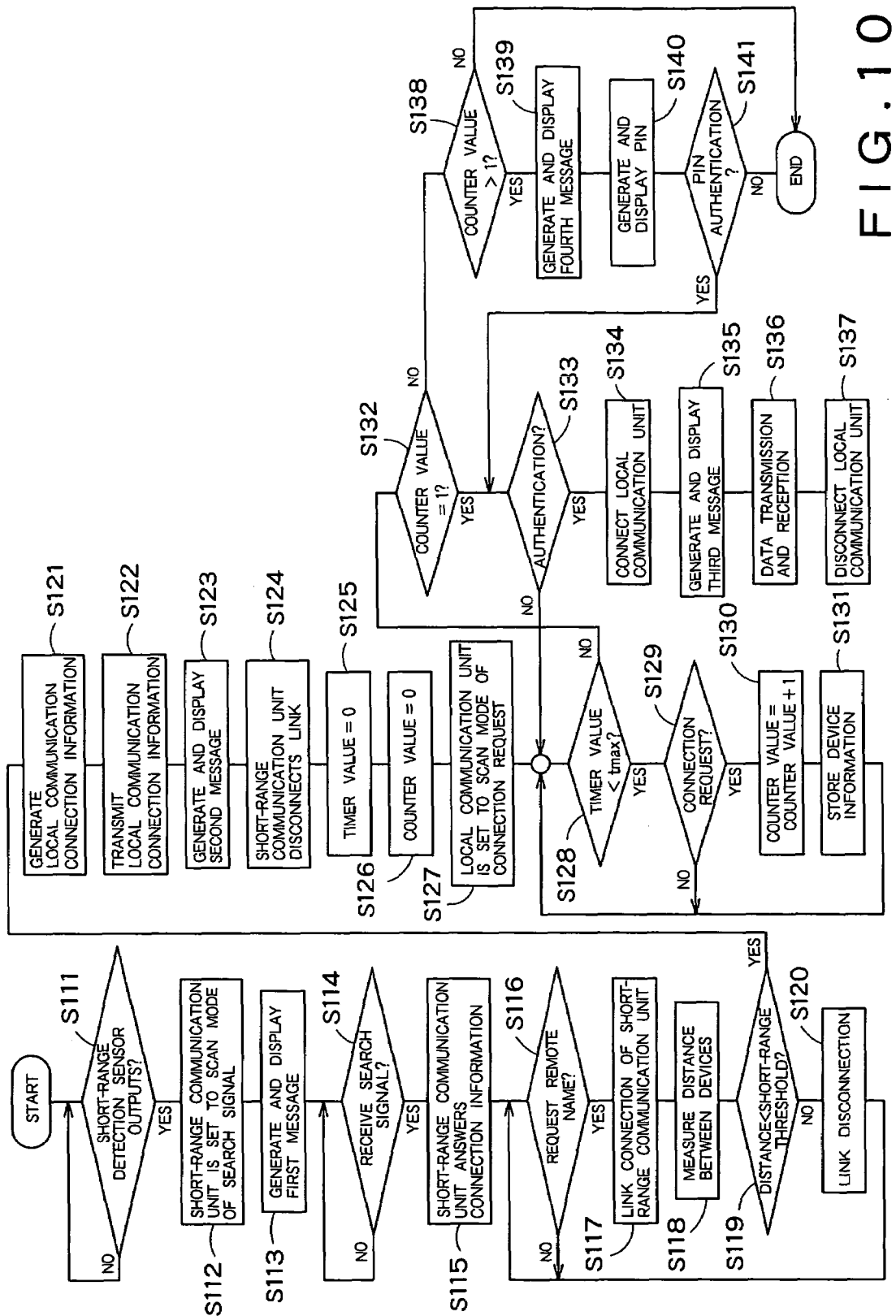
FIG. 10 is a flow chart showing an example of a processing procedure of the short-range communication system shown in FIG. 9.

FIG. 10 is a flow chart showing an example of a processing procedure of the short-range communication system shown in FIG. 9. Hereafter, processing operation of the short-range communication system shown in FIG. 10 will be described featuring the processing differing from that shown in FIG. 8.

After the short-range communication unit 12 in the Bluetooth apparatus 2 has conducted link connection with a Bluetooth portable terminal 3, the distance measurement unit 34 measures the distance from the Bluetooth portable terminal 3 (step S118). If the measured distance is longer than a predetermined threshold, the link is disconnected (step S120) and the processing returns to the step S116. If the measured distance is equal to the predetermined threshold or less, connection information of the local communication unit 11 is generated (step S121), and the generated connection information is transmitted to the Bluetooth portable terminal 3 (step S122). Subsequent processing is similar to that shown in FIG. 8.

Figure 11:
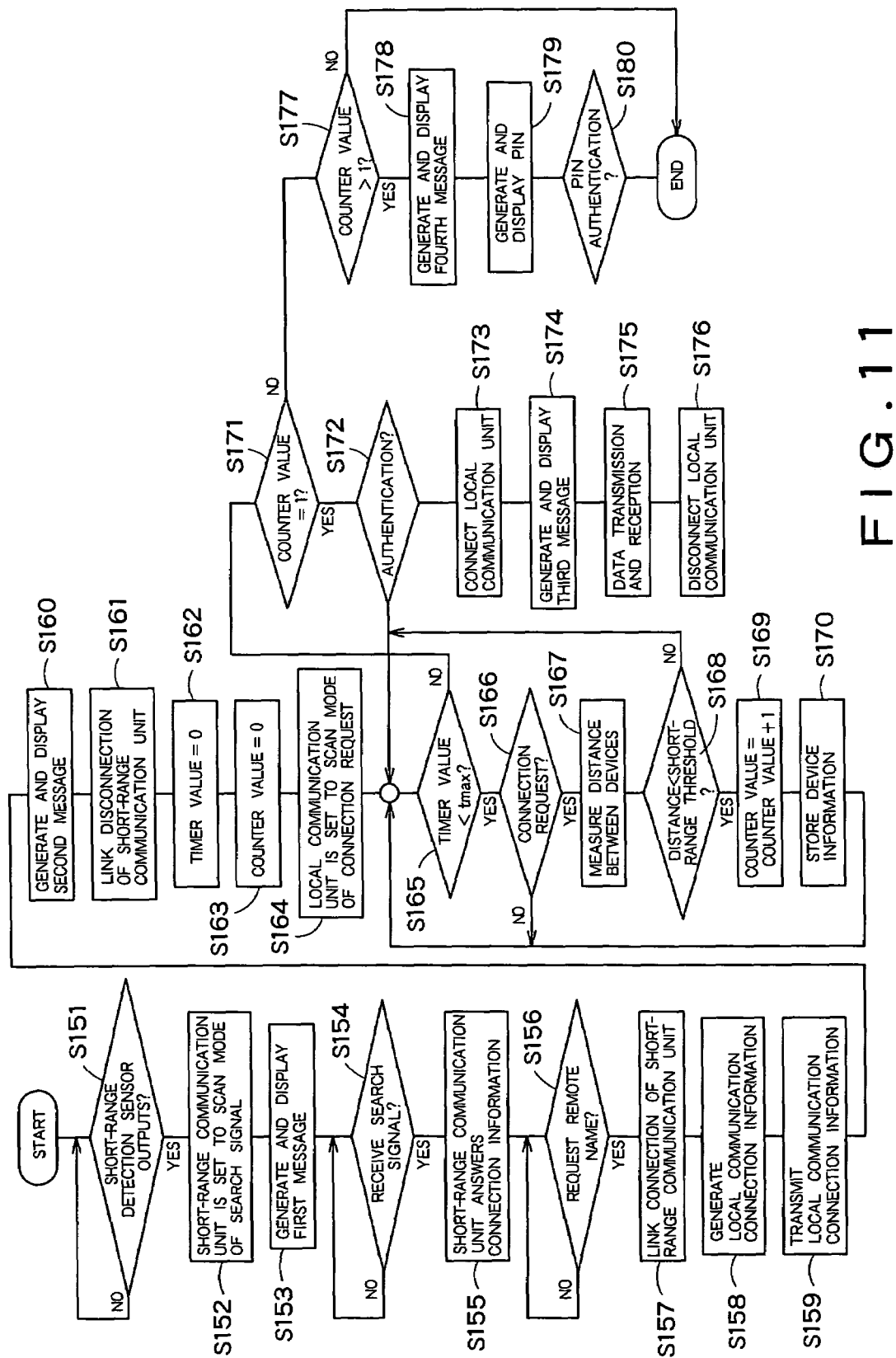
FIG. 11 is a flow chart showing a variant of a processing procedure of the short-range communication system shown in FIG. 9.

FIG. 11 is a flow chart showing a variant of a processing procedure of the short-range communication system shown in FIG. 9. In the processing procedure shown in FIG. 11, upon a connection request from a Bluetooth portable terminal 3 to a local communication unit 11 (step S166), the distance from the Bluetooth portable terminal 3 is measured (step S167). If the measured distance is longer than a threshold, the processing returns to the step S165, a connection request from another Bluetooth portable terminal 3 is waited for. If the measured distance is equal to the threshold or less, the value of the counter 31 is incremented by "1," device information of a Bluetooth portable terminal 3 that has issued a connection request is stored (step S170), and then the processing is returned to the step S165.

Thus, in the fifth embodiment, the connection information of the local communication unit 11 is transmitted to a Bluetooth portable terminal 3 only in the case where the distance from the Bluetooth portable terminal 3 is equal to the threshold or less. Therefore, connection to only a nearby Bluetooth portable terminal 3 can be conducted, and there is no likelihood that the service is provided to an unintended opposite party.

The service providing apparatus described above in the embodiments may be implemented by hardware, or may be implemented by software. In the case where the service providing apparatus is implemented by software, a program to implement the function of the service providing apparatus may be stored on a recording medium, such as a floppy disk or a CD-ROM, or may be read by a computer to be executed thereby. The recording medium is not limited to a portable medium such as a magnetic disk or an optical disk, but may also be a stationary recording medium such as a hard disk device or a memory.

Furthermore, a program for implementing the function of the service providing program may also be distributed via a communication line (including radio communication) such as the Internet or the like. In addition, the program may be distributed in such a state that the program is encrypted, modulated or compressed, via a wired line, such as the Internet, or a radio line, or in a form stored in a recording medium.

Note that the present invention is by no means limited to the above embodiments and may be embodied by modifying the components thereof within a range that does not depart from the gist of the invention. Other embodiments of the present invention will be apparent to those skilled in the art from consideration of the specification and practice of the invention disclosed herein. It is intended that the specification and example embodiments be considered as exemplary only, with a true scope and spirit of the invention being indicated by the following. Further, the components of different embodiments may be appropriately combined.

What is claimed is:

1. A service providing apparatus, comprising:
   a first communication unit configured to perform wireless communication with a service receiver located within a first wireless area;
   a second communication unit configured to perform wireless communication with said service receiver located within a second wireless area narrower than said first wireless area;
   a connection information generator which generates connection information necessary to the communication with said service receiver when the communication is performed through said first communication unit;
   an existence detector which detects whether or not said service receiver locates within a prescribed distance;
   an existence confirmation request receiver which receives an existence confirmation request signal transmitted by said service receiver, through said second communication unit when detected that said service receiver is located within the prescribed distance;
   a connection information transmitter which transmits the connection information generated by said connection information generator to said service receiver through said second communication unit as a reply of said existence confirmation request signal;
   an authentication unit configured to authenticate said service receiver which requested connection based on the transmitted connection information, through said first communication unit; and
   a service providing unit configured to connect with said service receiver authenticated by said authentication unit and provide the services to said service receiver through said first communication unit.

2. The service providing apparatus according to claim 1, further comprising a first message generator which generates a message notifying that the existence confirmation request signal from said service receiver can be received.

3. The service providing apparatus according to claim 1, further comprising a second message generator which generates a message notifying that the connection request from said service receiver can be received.

4. The service providing apparatus according to claim 1, further comprising a third message generator which generates a message notifying that connection processing with said service receiver has been completed.

5. The service providing apparatus according to claim 1, further comprising a measurement unit configured to measure the number of said service receivers which has performed the connection request within a prescribed time; and an authentication determination unit configured to determine whether or not to perform authentication procedure by authentication unit in accordance with the number measured by said measurement unit.

6. The service providing apparatus according to claim 1, further comprising a fourth message generator which generates a message notifying that the number of said service receivers is two or more.

7. The service providing apparatus according to claim 1, further comprising a measurement unit configured to measure the number of said service receivers which perform connection request within a prescribed time; and
an individual authentication unit configured to authenticate said service receivers which has performed the connection request, if the number of said service receivers measured by said measurement unit is two or more, before said authentication unit performs the authentication.

8. The service providing apparatus according to claim 1, further comprising a distance detector which determines whether or not a distance from said service receiver is within a prescribed length,
wherein said connection information transmitter transmits the connection information to said service receiver if said distance detector determines to be within the prescribed length.

9. The service providing apparatus according to claim 8, wherein said distance detector detects the distance from said service receiver by measuring a radio field intensity of a radio wave transmitted from said service receiver.

10. The service providing apparatus according to claim 1, comprising a distance detector which determines whether or not a distance from said service receiver is within a prescribed length, after the connection request is received from said service receiver through said first communication unit,
wherein said authentication unit performs the authentication procedure if said distance detector determines to be within the prescribed length.

11. The service providing apparatus according to claim 10, wherein said distance detector detects the distance from said service receiver by measuring a radio wave intensity of a radio wave transmitted from said service receiver.

12. A computer readable medium including computer executable instructions, wherein the instructions, when executed by a processor, cause the processor to perform a method comprising:
performing a first wireless communication with a service receiver located within a first wireless area;
performing a second wireless communication with said service receiver located within a second wireless area narrower than said first wireless area;
generating connection information necessary to communication with said service receiver when performing said first wireless communication;
detecting whether or not said service receiver locates within a prescribed distance;
receiving an existence confirmation request signal transmitted from said service receiver through said second wireless communication when it is detected that said service receiver locates within the prescribed distance;
transmitting the connection information to said service receiver through said second wireless communication as a reply of said existence confirmation request signal;
authenticating said service receiver which has requested connection based on the transmitted connection information, through said first wireless communication; and
providing services to the authenticated service receiver through said first wireless communication.

13. The computer readable medium according to claim 12, which makes a computer operate the step of further comprising:
generating a first message notifying that an existence confirmation request signal from said service receiver can be received.

14. The computer readable medium according to claim 12, which makes a computer operate the step of further comprising:
generating a second message notifying that connection request from said service receiver can be received.

15. The computer readable medium according to claim 12, which makes a computer operate the step of further comprising:
generating a third message notifying that connection processing with said service receiver has been completed.

16. The computer readable medium according to claim 12, which makes a computer operate the step of further comprising:
measuring the number of said service receivers which have performed connection request within a prescribed time; and
determining whether or not to perform authentication procedure in accordance with the measured number.

17. The computer readable medium according to claim 12, which makes a computer operate the step of further comprising:
generating a fourth message notifying that the number of said service receiver measured by a measuring unit is two or more.

18. The computer readable medium according to claim 12, which makes a computer operate the step of further comprising:
measuring the number of said service receivers which have performed connection request within a prescribed time; and
authenticating said service receivers which have performed connection request when the number of said service receivers which performed connection request within a prescribed time is two or more, before performing the authentication by said authentication unit.

19. The computer readable medium according to claim 12, which makes a computer operate the step of further comprising: determining whether or not a distance from said service receiver is within a prescribed length, before said connection information transmitter transmits the connection information,
wherein the connection information is transmitted to said service receiver when determined to be within the prescribed length.

20. The computer readable medium according to claim 12, which makes a computer operate the step of further comprising: determining whether or not a distance from said service receiver is within a prescribed length,
wherein authentication procedure is performed when determined to be within said prescribed length.

21. A service providing method, comprising:
performing a first wireless communication with a service receiver located within a first wireless area;
performing a second wireless communication with said service receiver located within a second wireless area narrower than said first wireless area;

generating connection information necessary to communication with said service receiver when performing said first wireless communication;

detecting whether or not said service receiver locates within a prescribed distance;

receiving an existence confirmation request signal transmitted from said service receiver through said second wireless communication when it is detected that said service receiver locates within the prescribed distance;

transmitting the connection information to said service receiver through said second wireless communication as a reply of said existence confirmation request signal;

authenticating said service receiver which has requested connection based on the transmitted connection information, through said first wireless communication; and providing services to the authenticated service receiver through said first wireless communication.

* * * * *